(12) United States Patent
Lawrence et al.

(10) Patent No.: US 6,272,481 B1
(45) Date of Patent: Aug. 7, 2001

(54) HOSPITAL-BASED INTEGRATED MEDICAL COMPUTER SYSTEM FOR PROCESSING MEDICAL AND PATIENT INFORMATION USING SPECIALIZED FUNCTIONAL MODULES

(75) Inventors: Victor Bernard Lawrence; Syed Vickar Ahamed, both of Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/152,809

(22) Filed: Sep. 14, 1998

Related U.S. Application Data

(63) Continuation-in-part of application No. 08/657,924, filed on May 31, 1996, now Pat. No. 5,809,493.

(51) Int. Cl.[7] .............................. G06F 17/00; G06F 15/00
(52) U.S. Cl. ................................................ 706/45; 706/10
(58) Field of Search ........................................ 706/45, 10

(56) References Cited

U.S. PATENT DOCUMENTS 4,763,277   8/1988   Ashford et al. ........................ 706/47

(List continued on next page.)

FOREIGN PATENT DOCUMENTS

0652528   *   5/1995   (EP) .

OTHER PUBLICATIONS

Blum et al, "Medical Informatics, Knowledge, and Expert Systems", Proceedings of the 4th Annual IEEE Symposium on Computer–Based Medcial Systems, May 1991.*

Shafer, Don, "CBR Express Getting Down to Cases", Jul./Aug., 1991, pp. 42–45, PCAI Magazine.

*Primary Examiner*—George B. Davis

(57) ABSTRACT

A hospital-based integrated medical computer system for processing medical and patient information and for evolving medical knowledge, diagnoses and prognoses is disclosed. The system includes a medical processor including a memory and a plurality of medical data banks connected thereto. The medical processor and the medical data banks are designed to work in tandem for executing a plurality of instructions and/or obtaining information. A plurality of separate processor hardware modules are operatively connected to the medical processor. The modules include a communication module, at least one switching module, an administrative module and a knowledge module. There is also hardware, firmware and software in the processor hardware modules to enable the modules to perform at least the following functions: for the communication module, to control data communication between the other modules, the memory and the medical processor, so that they effectively communicate with one another; for the switching module(s), to select and switch between the various medical data banks for solving a particular problem; for the administrative module, to perform housekeeping functions, including multi-tasking control with resource allocation, real-time multi-tasking and scheduling of tasks; and, for the knowledge module, to operate knowledge processing functions and to store information in the medical data banks. General patient databases, physician access point units, patient access point units, and service facilities are connected to the medical data banks and medical processor via several buses. In an alternative integrated medical computer system, a plurality of processors are included with their own memories and modules and are linked together to establish a processor net unit. This system is contemplated for use in a campus environment where several buildings comprise the hospital or where several hospitals are interlinked via an integrated services digital network (ISDN).

31 Claims, 5 Drawing Sheets

U.S. PATENT DOCUMENTS

| | | |
|---|---|---|
| 4,868,763 | 9/1989 | Masui et al. .......................... 706/10 |
| 4,899,839 | 2/1990 | Dessertine et al. ............... 177/25.19 |
| 4,920,499 | 4/1990 | Skeirik .................................. 706/11 |
| 5,016,172 | 5/1991 | Dessertine .......................... 600/300 |
| 5,208,898 | 5/1993 | Funabashi et al. ................... 706/45 |
| 5,257,185 | 10/1993 | Farley et al. ........................ 707/100 |
| 5,282,265 | 1/1994 | Suda et al. ............................ 706/11 |
| 5,307,446 | 4/1994 | Araki et al. ............................ 706/59 |
| 5,386,498 | 1/1995 | Kakefuda .............................. 706/59 |
| 5,418,943 | 5/1995 | Borgida et al. ......................... 707/4 |
| 5,465,319 | 11/1995 | Ahamed ................................ 706/10 |
| 5,615,112 * | 3/1997 | Sheng et al. ........................ 707/104 |
| 5,715,371 | 2/1998 | Ahamed et al. ...................... 706/10 |

* cited by examiner

HOSPITAL-BASED INTEGRATED MEDICAL COMPUTER SYSTEM FOR PROCESSING MEDICAL AND PATIENT INFORMATION USING SPECIALIZED FUNCTIONAL MODULES

This application is a continuation-in-part application of U.S. patent application Ser. No. 08/657,924 filed on May 31, 1996, U.S. Pat. No. 5,809,493. This application is also based on U.S. patent application Ser. No. 08/148,050 filed on Nov. 5, 1993, now abandoned.

BACKGROUND OF THE INVENTION

1. Field of the Invention

The present invention relates to architecture for an integrated medical computer system and more specifically to a system utilizing one or more processors having separate modules for predetermined functions. More particularly, the present invention relates to an integrated medical computer system which includes separate modules for communication, switching and administration, as well as the addition of a plurality of medical data banks having medical information stored therein.

2. Background of the Related Art

U.S. Pat. No. 4,899,839 describes a method of monitoring a patient's medicine compliance. It involves weighing a container of medicine to determine a starting weight on a scale which is connected to a computer with a display unit and storing the starting weight in the computer followed by reweighing the container of medicine after a pre-described dosage is consumed to determine a second weight. The computer then determines the difference between the starting and said second weight to store a dosage unit weight. The computer is programmed to calculate compliance required weights of the container for each dosage administration for the prescription period of the medicine. The container of medicine is reweighed from time to time on the scale to compare actual weight with compliance required weight to determine compliance and the computer visually displays the compliance results on the display unit to permit compliance monitoring. Optionally, other patient characteristics are also monitored and feedback is provided.

U.S. Pat. No. 5,016,172 is also directed to patient compliance and a status monitoring system. It involves utilizing an automatic compliance monitoring device which stores compliance information and which may be connected to a computer with a display unit. The compliance monitoring device or the computer is programmed to calculate compliance requirements of the container, e.g., by number of cap openings, by dispensing count or by weight information obtained by the automatic compliance monitoring device, for each dosage administration for the prescription period. The automatic compliance monitoring device is periodically, occasionally, or randomly connected to the computer to compare actual usage with compliance required to determine compliance monitoring on a monitor at a remote location. Optionally, other patient characteristics are also monitored and feedback is provided.

While both of the above prior art patents utilize computer systems to provide patient monitoring information to a professional via a computer with feedback capabilities, they are limited by conventional computer architecture and do not teach or suggest the physical modules, integrated medical system processes, architecture and capabilities of the present inventive system.

In conventional processing of data, the central processing unit plays the dominant role in executing the binary instructions in a pre-defined programmed sequence. Data availability and access is made feasible by the linking and loading functions. The processes involved in installing executable binary codes into the computer in usable form, are compiling, assembling and linking as well as the actual loading of the program and of the data into the core storage area of the computer. One process generally (and conveniently) forgotten by the computer scientists is the higher level language programming of a problem that is to be solved. Assuming no errors in these processes, the machine sequentially executes these instructions and brings the program to a normal termination and provides the user with the results that were being sought by the user without attention to the language of the program loaded into the computer.

In telecommunication networks with electronic switching, the switching system or systems plays the dominant role in executing the various steps that are necessary for call processing. The sequence of the steps necessary for the completion of call processing is much more varied than the sequence of instructions for data processing. The switching systems may be distributed and the cooperative role of the various switching systems may become essential. This aspect is not unlike the controlled distribution of the processing in multi-processor/multi-computer systems. Fortunately, with the evolution of the common channel interoffice signaling system and the standardization of its protocol, distributed call processing is not a problem in most modem communication networks. It is interesting to note that the level of programming in the switching systems is at higher level than the programming level of the third generation programming languages. This jump leaves the programmers of the switching systems with the more mundane functions of generating the executable code for the normal three modules (communication, switching, and administrative) of the switching system.

In modem intelligent networks, the service provisioning of the special services becomes the cooperative role of at least five well known interdependent computerized systems. These interdependent computerized systems are the service switching points, the service transfer points, the service control points, the service creation environment and intelligent peripherals.

Some of these known systems described above are modified and/or supplemented in the present invention to create a unique integrated medical computer system environment having significant advantages over the prior art systems.

SUMMARY OF THE INVENTION

The present invention involves a hospital-based integrated medical computer system for processing medical and patient information and for evolving medical knowledge, diagnoses and prognoses. It includes a medical processor including a memory and a plurality of medical data banks connected thereto. The medical processor and the medical data banks are designed to work in tandem for executing a plurality of instructions and/or obtaining information. A plurality of separate processor hardware modules are operatively connected to the medical processor. The modules include a communication module, at least one switching module, an administrative module and a knowledge module. There is also hardware, firmware and software in the processor hardware modules to enable the modules to perform at least the following functions: for the communication module, to control data communication between the other modules, the memory and the medical processor, so that they effectively communicate with one another; for the switching module(s), to select and switch between the various medical data banks for solving a particular problem; for the administrative module, to perform housekeeping functions, including multi-tasking control with resource allocation, real-time multi-tasking and scheduling of tasks; and, for the knowledge module, to operate knowledge processing functions and to store information in the medical data banks. General patient databases, physician access point units, patient access point units, and service facilities are connected to the medical data banks and medical processor via several buses. In an alternative integrated medical computer system, a plurality of processors are included with their own memories and modules and are linked together to establish a processor net unit. This system is contemplated for use in a campus environment where several buildings comprise the hospital or where several hospitals are interlinked via an integrated services digital network (ISDN).

BRIEF DESCRIPTION OF THE DRAWINGS

The present invention is more fully understood when the specification herein is taken in conjunction with the drawings appended hereto, wherein.

DETAILED DESCRIPTION OF THE INVENTION

I. Introduction

Figure 1:
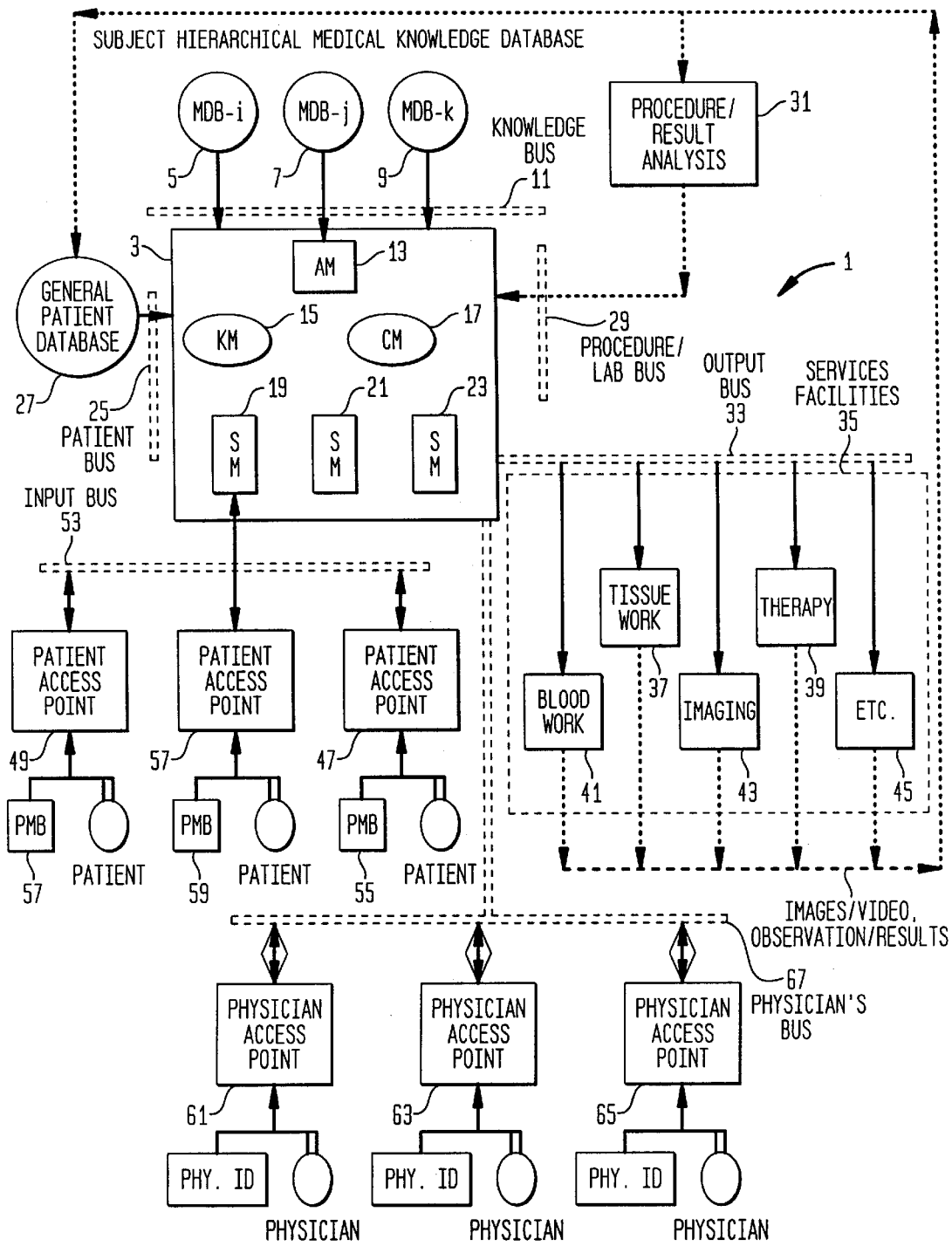
FIG. 1 illustrates a schematic diagram of a present inventive integrated medical computer system hospital-based medical processor unit with six buses for monitoring the flow of information in a large medical complex.
Figure 2:
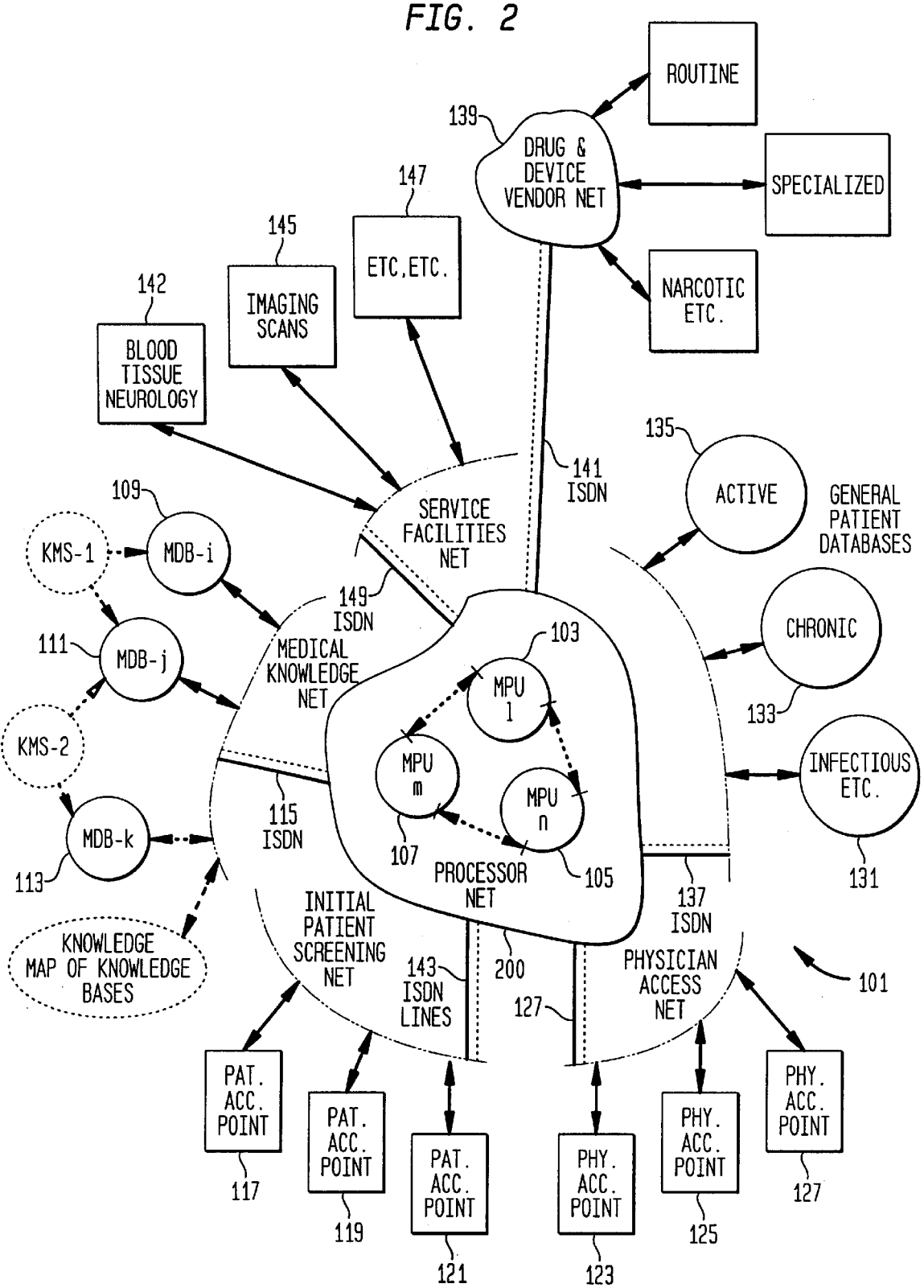
FIG. 2 illustrates an additional embodiment of a present inventive network based integrated medical, computer system which has a plurality of processors, switching modules and knowledge modules.
Figure 3:
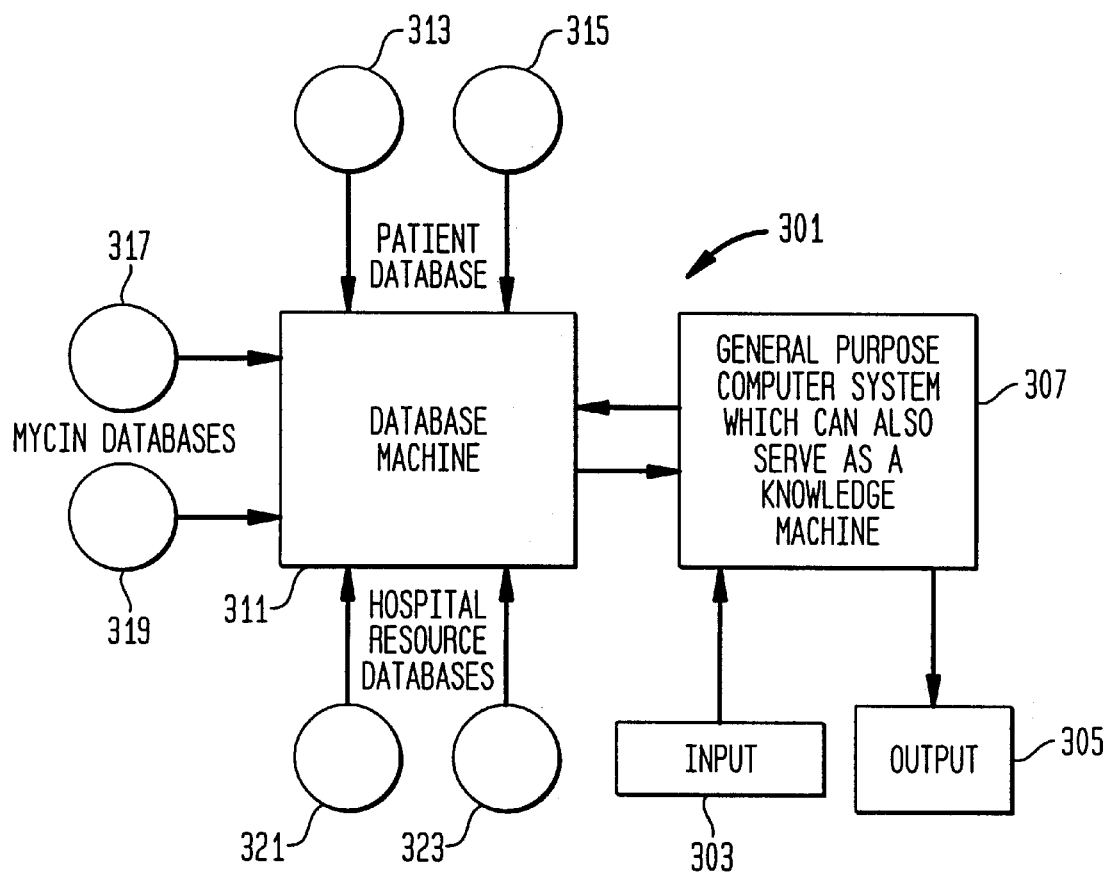
FIG. 3 illustrates a simplified version of a present inventive integrated medical computer system with limited functionality.

As shown in FIGS. 1–5, the present inventive integrated medical system I includes a medical processor 3, medical data banks 5, 7 and 9, and other components described below in conjunction with FIGS. 1–3. The present inventive integrated medical system 1 operates according to the methods described below in conjunction with FIGS. 4–5. Additional information relating to the present disclosure can also be found in commonly assigned, copending U.S. patent application Ser. No. 08/657,924 filed on May 31, 1996, the contents of which are incorporated herein by reference.

II. Architectural Considerations 2.1 Processor-Based Local-Knowledge-Bank System FIG. 1 shows a processor-based local medical data bank integrated medical computer system 1. Here, the medical processor 3 and the medical data banks 5, 7 and 9 are in close proximity such that bus lines can be extended from medical processor 3 to the medical data banks 5, 7 and 9. The medical data banks 5, 7 and 9 include a plurality of subareas of knowledge. This generally includes information from medical text books, academic information, and information based on the experience of medical professionals. In general, the information within the medical data banks 5, 7 and 9 is complete, thorough, and up-to-date.

Addressing to a particular medical database is done via a bus-selector through knowledge bus 11 tied to the particular medical data bank. The address of the bus may be consistent with the classification of the information stored in that particular bank thus reducing the seek time in these massive information stores. In such systems, the instruction to the medical data bank is followed by a burst of input data via a direct memory access channel. Note that the contact between the patients and the physicians may be in real-time or via remote access.

Considerable latitude exists in the design of the memory, processor, and the bus structures. At one extreme, the medical data banks 5, 7, 9 are bursting their entire segments of all the relevant information back to the main memory of the medical processor 3 where the instruction is executed. At the other extreme, a complete instruction is dispatched by the medical processor 3 to the medical data banks 5, 7, 9 and the medical data banks 5, 7, 9 use their own local processors to execute instructions or part thereof The partial result (in a shorter burst) of the instruction is dispatched back to the medical processor 3.

This aspect of the processing is novel over the conventional computing environments where the present inventive system I has part of the execution of the instruction take place in the medical processor 3 and part of the execution of the instruction take place in the medical data banks 5, 7 and 9. For example, the medical processor 3 performs the functions that are microscopic in nature and bear an immediate outcome from a specific medical instruction. On the other hand, the medical data banks 5, 7 and 9 perform a global search and/or contextual search on a medical topic or a procedure within the vast amounts of information contained and stored therein. In a sense, the medical processor 3 can be seen as a microcomputer within the environment of a macrocomputer due to the interaction with the knowledge banks 5, 7 and 9.

Alternatively, the network environment of the medical data banks 5, 7 and 9 drive the medical processor 3 to perform the associated micro-medical functions of the macro-medical functions. Typical of such macro-functions in the medical data banks 5, 7 and 9 is "Analyze the symptoms of a patient and trace the genealogy of the possible diseases associated with the symptoms." Typical of the associated micro-functions in the medical processor 3 is "For the particular disease for the patient with a given history, weight, age and other patient data (from the patient database), compute the dosage of Prescription #1, Prescription #2, etc. and dispatch the dosage to the pharmacy". Some of the sophisticated database software packages known in the art perform these functions for the integrated medical system. The compromises in the cost and performance are evident from the two hardware configurations.

The arithmetic, logical and the contextual functions that are local in nature are performed by the medical processor 3 and the knowledge-based, expert system-based and generic functions are performed by the medical data banks 5, 7 and 9. It is contemplated that the medical data banks 5, 7 and 9 perform their functions in conjunction with the search engines associated with the medical data banks 5, 7 and 9. The most logical place for these search engines and other such hardware would be in the Knowledge Map of the Knowledge Bases 109, 111 and 113 in FIG. 2.

Every subprocedure is thus executed and the net result of the procedure is conveyed to the user (or the user program). The output is generated from subprocedures, procedures, runs, and entire usage of the integrated medical system in an orderly and systematic fashion. Debugging of the integrated medical system functions becomes as easy as reading the registers and core dump of the medical processor unit 3 or the registers and the core dump of the local processing units of the medical data banks 5, 7 and 9.

The medical processor 3 includes a memory and an administrative module 13, a knowledge module 15, a communication module 17 and switching modules 19, 21 and 23. The knowledge module 15 includes a plurality of subprocesses. The communication module 17 has software to further control communication between the subareas of the medical data banks 5, 7 and 9 and the knowledge module 15; to control the subprocesses as they pertain to the input medical problem; and to systematically organize inputs and outputs of the subprocesses to execute the medical instruction to generate a medical knowledge diagnosis as the solution for the input medical problem.

Several of the functions of the administrative module 13 include keeping track of which patient needs to be charged what fees and for which services; which clinical lab needs to be paid, how much, for what services, and for which patient; and keeps track of accounts receivable and accounts payable for the hospital or medical center. The administrative module 13 also allocates all resources to the appropriate needs within the hospital and performs the functions akin to the functions of an operating system in a computer environment. The hardware and executable software of the administrative module 13 is the mechanism for the enforcement of overall optimality and a higher level of performance for the system 1. It also generates the reports for the hospital management to verify the accountability of every unit of the hospital or medical facility.

The knowledge module 15 stores up-to-date information from text books, academic information, information based on experience, and collected wisdom of the medical profession. In short, all of the information that the medical teams can learn in universities, look up in medical journals, research in medical libraries, hear in medical conference proceedings, etc.

The communication module 17 switches the appropriate query to the right knowledge base. This is done in accordance to pre-programmed instructions, such that the total network access time is minimized. The switching modules 19, 21 and 23 provide the pathways via the communication medium (i.e., electrical, microwave, fiber, satellite, etc.) that the hospital-based system is built.

In addition to the knowledge bus 11 indicated above, there is a patient bus 25 connected to general patient database 27, a procedure/lab bus 29 connected to a procedure/result analysis 31. Output bus 33 is connected to services facilities 35, which may, for example, include tissue work 37, therapy 39, blood work 41, imaging 43, and others (etc.) 45, such as, for example, urinalysis.

Medical processor 3 is also connected to a plurality of patient access point units 47, 49 and 51 via input bus 53 which may be located at and operated from a remote location from the processor 3. These units include individual patient medical bases 55, 57 and 59 and include input to the medical processor 3 as well as output from processor 3. These units monitor patient's conditions, input data, provide instruction to the patient and track patient conditions and alert the hospital staff and/or physician(s) to such changes.

In an exemplary embodiment, the medical processor 3 is connected to a plurality of physician access point units 61, 63 and 65 via physician's bus 67. Through these units physicians access services facilities 35, procedure/result analysis 31, any or all medical data banks 5, 7 and 9, general patient database 27 and patient access point units 47, 49 and 51. The physicians can access these components through the medical processor 3 as a direct user via such buses described above, or indirectly by query to the medical processor 3, whereby the medical processor 3 utilizes whatever modules, memory, programs, subprograms, buses and connected units and facilities as may be necessary or appropriate to respond to particular queries posed by the physician user.

In addition, the physician-based, remotely located physician access point units 61, 63 and 65 are connected to the medical processor 3 for operating the processor 3 from remote sources using the processor hardware modules connected to the processor 3 by the data bus 67.

2.2 Distributed-Knowledge-Bank System

A different configuration of the present inventive system is shown in FIG. 2 and designated by reference numeral 101. In this system 101, many medical processor units and medical data banks 109, 111 and 113 are linked via a high speed integrated services digital network 115 (ISDN). System 101 is designed for a network-based hospital system, where many campuses of the hospital may exist or several hospitals may be networked in a community. When system 101 is deployed, each of the buildings of the hospital has the system 1 shown in FIG. 1 and is networked with the other buildings such that all the buildings of the medical campus or all of the hospitals in a community function as one sophisticated and intelligent hospital system.

Isolated packets of information arrive at the medical data banks 109, 111 and 113 from numerous integrated medical systems (as shown by FIG. 1) connected therewith. The transmission of the isolated packets of information, is initiated by queries by the medical professionals or patients. The information packets arrive at the medical data banks 109, 111 and 113 via the communication and switching modules of the hospital system.

The collection of numerous units, such as units 103, 105 and 107 form a processor net 200. Optimal protocol design and packet structure is a matter of design by the artisan now that this environment has been defined. For example, the addressing of the distant medical data banks is done via a subject matter identifier allocated to the distant medical data bank. This identifier of the medical data bank is consistent with the information stored in that particular bank thus reducing the switching time to these massive information stores. In a preferred embodiment, the identifier system is based on the subset of the Dewey Decimal System which provides the road map to the storage of knowledge and information within the medical data banks of each facility. If this is consistent throughout the community of hospitals, then the interhospital access of information becomes quick and streamlined.

The instruction to the medical data bank is followed by a burst of input data, similar to the burst of information described above with respect to FIG. 1, via the packet switching network located within processor net 200. (It should be assumed that processor net 200 contains individual processors similar to the medical processor 3 of FIG. 1 having an administrative, knowledge and communication modules therein.)

Every subprocedure is thus executed via an individual packet command. The net result of the procedure is conveyed to the user (or the user program) by a series of packet transactions. Such transactions between a single integrated medical system and multiple medical data banks are systematically processed and the output is accumulated from subprocedures, procedures and runs. The entire usage of this present inventive network based integrated medical system is as orderly and systematic as job processing in distributed computer environments.

The integrated medical system 101 may not only include integrated services digital network 115 for connection to medical data banks of every hospital and facility, but may have a plurality of integrated services digital networks for various predetermined functions. Thus, integrated services digital network 143 is connected from net 200 to patient access point units 117, 119 and 121; integrated services digital network 129 is connected from processor net 200 to physician access point units 123, 125 and 127. Likewise, net 200 is connected to general patient databases, such as infectious diseases 131, chronic illnesses 133 and active ailments 135, via integrated services digital network 137; is connected to drug and device vendor net 139 via integrated services digital network 141; and is connected to service facilities net functions such as blood, tissue and neurology 142, imaging scans 145 and other functions 147, via integrated services digital network 149.

III. Operation of the Present Inventive Integrated Medical System

Figure 4:
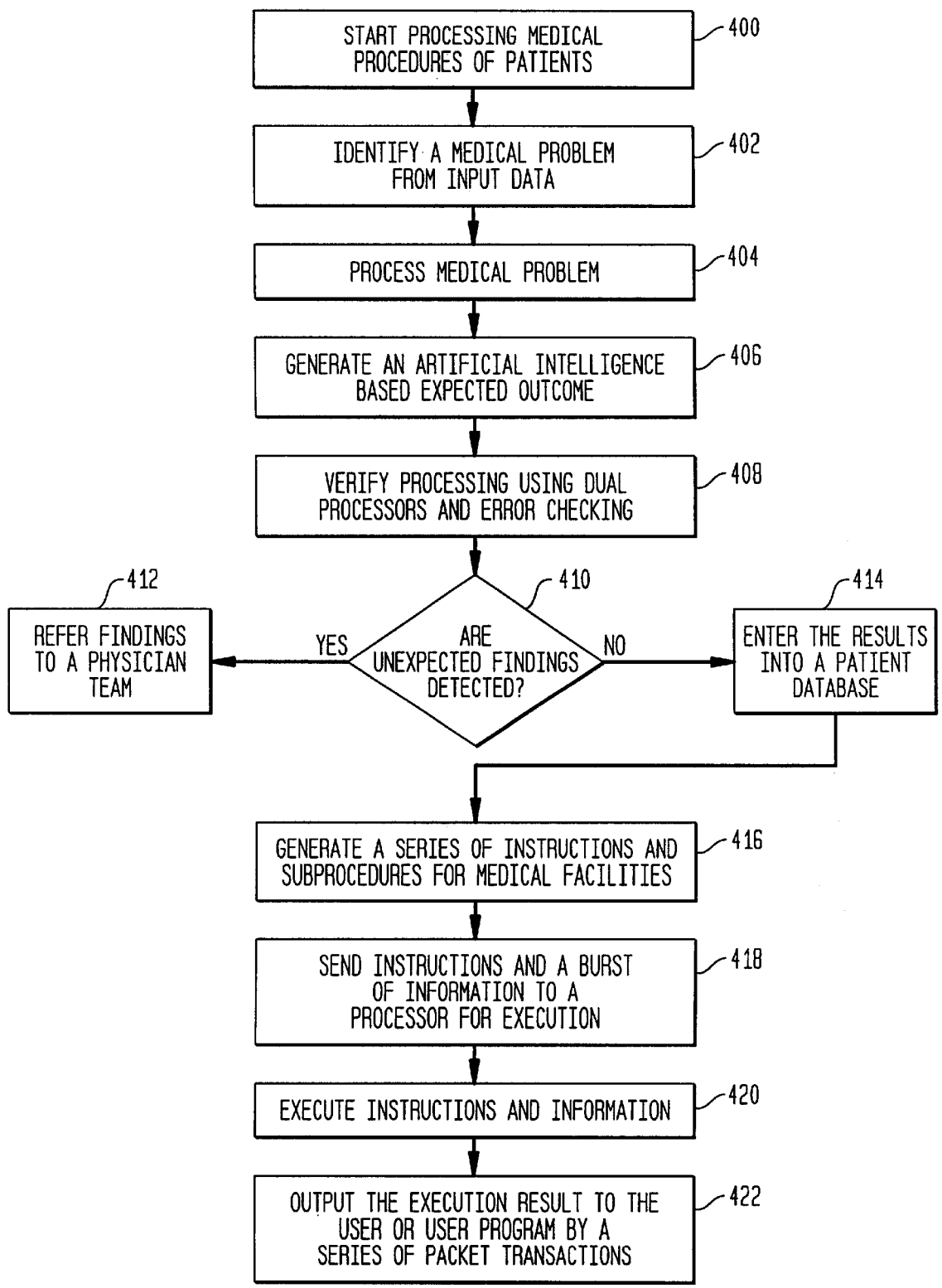
FIG. 4 illustrates a flow chart of the operation of the system of FIG. 1.

Referring to FIG. 4, the operation of the present inventive integrated medical system 1 includes starting the processing medical procedures of patients in step 400; identifying a medical problem from input data in step 402; and processing the medical problem in step 404. Step 402 is accomplished by comparing the input data with stored data mapped to specific medical problems to determine the medical problem of each patient. The present inventive integrated medical system 1 then generates an artificial intelligence based expected outcome in step 406; and verifies the processing using dual processors and error checking in step 408.

The artificial intelligence based expected outcome in step 406 is generated by the medical processor 3. The medical processor has the knowledge module 15 embedded in it. This module processes the information from the medical data banks 5, 7 and 9; from the general patient database 27; and from Procedure/Result Analysis Unit 31. This is enough information for the expert systems programs in the memory part of the Integrated Medical System to generate the artificial intelligence based expected outcome based on the context for that particular patient which can be appreciated by one skilled in the art. One can also refer to commonly assigned U.S. Pat. No. 5,465,319, issued Nov. 7, 1995, the contents of which are incorporated herein by reference.

The history of the patient is stored in the general patient database 27. The medical analysis is based on the information derived from the medical data banks 5, 7 and 9. The context of the patient is derived from the Procedure/Result Analysis unit 31 and the patient access point units 47, 49 and 51 giving the information about that patient at that particular time.

If any unexpected findings are determined in step 410, then the unexpected findings are referred to a medical team on duty in step 412. Otherwise, the results of the procedures are entered into a patient database in step 414.

The present inventive integrated medical system 1 then generates a series of instructions and subprocedures for medical facilities in step 416 via the medical processor 3. The knowledge module 15 within the medical processor 3, in conjunction with the expert system program and other relevant information, is used to generate the series of instructions and subprocedures.

After the medical system 1, generates the series of instructions and subprocedures, the system 1 sends the instructions and a burst of information to a processor, which may be the medical processor 3 or one of the medical data banks 5, 7 and 9 for execution in step 418. The burst of information sent to the processor includes an executable program and the relevant data about the patient.

The medical system 1 properly determines which processor to send the burst of information. The determination is made based on the context of the procedure in the burst itself. For example, if the burst of information relates to blood work, the series of instructions will be routed to the processor corresponding to hematology. Upon receiving the series of instructions and the burst of information, the appropriate processor executes the instruction in step 420; and the results of execution of the instruction is output to the user or user program by a series of packet transactions in step 422. The results may invoke action on the part of the medical staff, such as giving out medication, carrying out a blood test, or ordering a nurse to provide physical therapy.

However, if after executing step 422, it is determined that the confidence level of the results is less than an acceptable number (stored in the medical data banks 5, 7 and 9) to make the diagnosis conclusive, then additional tests/procedures are imposed until the confidence level reaches the required level. This required level is based on the information in the medical data banks 5, 7 and 9.

Figure 5:
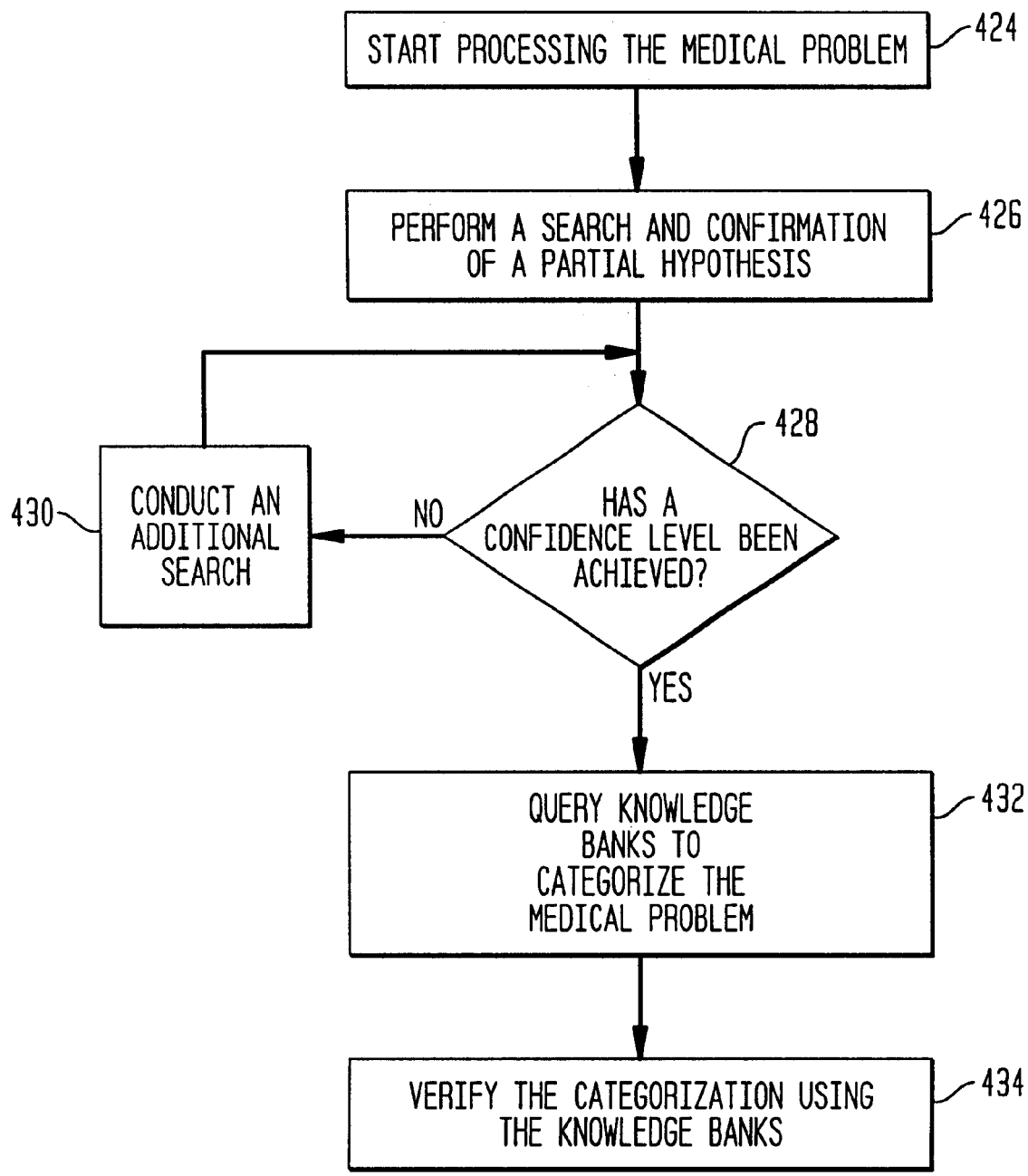
FIG. 5 illustrates a flow chart of the processing of a medical problem by the system of FIG. 1.

Therefore, if after execution of steps 416 to 422, there is a need to obtain additional test results, then referring to FIG. 5, the processing of the medical problem in step 404 in FIG. 4 is initiated once again which includes the steps of starting to process the medical problem in step 424 to diagnose the ailment and identify a treatment, performing a search and confirmation of a partial hypothesis in step 426 to accept or reject the partial hypothesis by performing additional diagnostic testing (these additional tests support or refute the original hypothesis, thus altering the confidence level), and determining if the appropriate or acceptable confidence level has been determined 428. Typically, the medical staff or the medical system 1 would not take any action until a minimum confidence level exists. This minimum confidence level is suggested by information in the medical data banks 5, 7 and 9, as noted above, stored within a database where each ailment/condition is assigned a minimum confidence level, or on the practical experience of the doctors.

If an acceptable confidence level has been reached (step 428) based on knowledge processing performed by the medical processor 3 or other unit (one can also appreciate the use of the knowledge processing system disclosed in commonly assigned, co-pending U.S. patent application Ser. No. 08/657,924, the contents of which are incorporated herein by reference, for determining the acceptable confidence level), the method then queries the medical data banks 5, 7 and 9 to categorize the medical problem in step 432, and the categorization is verified in step 434 using the medical data banks 5, 7 and 9. An additional search is conducted in step 430 if an acceptable confidence level has not been reached. It is noted that if in step 420, it is determined that additional testing is not required (i.e., an acceptable confidence level has been reached), then the procedure stops at 420 and the treatment is complete.

In the present inventive integrated medical system 1, the processing is based upon the methodology fundamental to any problem solving. The present integrated medical system operates to identify a medical problem from the data at hand. It then searches its medical data banks 5, 7 and 9 for information to confirm the medical problem based upon a partial hypothesis or a hunch (intuitive pattern match). When a certain level of confidence is achieved, the existing medical data banks are queried about categorizing the problem at hand. If the data is insufficient, an additional search is conducted to gain additional confirmation/denial of the partial hypothesis. Under conditions of certainty in the cause-effect relationship, fewer searches lead to the required confidence level before the solution is initiated. Under uncertainty or fear of persecution, more confirmation and consultation is sought regarding categorization, verifying the existing medical data banks, and then the eventual solution to the problem accrues.

In the operation of the present integrated medical system, these steps are iterated many times over, especially if there are numerous intertwined problems, numerous cause-effect relationships, and numerous remedies. Lack of complete input data causes additional uncertainty. Whereas every patient is unique in his/her own right, there is enough science and logic embedded in the profession that computers and networks can handle the various steps in the solution to the problem quickly, systematically, and within any given percentage of confidence. Apart from steps in the remedy and cure, the present inventive integrated medical system may also handle more mundane aspects of accounting, patient history tracking, resource allocation, scheduling, record keeping, and security of information. Follow-up procedures can also be made thorough and complete. The architecture is flexible to permit the integrated medical system to function in any type of a medical facility ranging from a dispensary to a complete hospital and health care complex.

The methodology upon which the integrated medical system functions is by partitioning the procedural steps in their modular microscopic or macroscopic forms. Logical relations between these steps permit their programming. Weak logical relations demand more intricate programs invoking additional searches or knowledge-based functions. Weak logic, coupled with uncertainty, reduces the confidence to an extent that the integrated medical system may turn the problem over to a group of on-line physicians.

One situation where human intervention is usually not needed is the communication network. Calls from the subscribers are routinely processed by telecommunication networks and special service oriented calls are processed by intelligent networks. These networks systematically reduce the switching, transmission, and administration function of call processing in a series of machine executable subfunctions and are completed in an orderly way depending upon the outcome of the previous process. The call is initiated, processed, monitored, and completed over the duration of the call. This may take several seconds (voice calls) to several months (dedicated lines) or even a life-time (700 numbers operations) depending upon the service required. In this situation, dealing with communication networks, the deeper insight and the superior perception of the human is not necessary for the call-processes which in the decade of the nineties are well streamlined and optimally programmed.

One situation where the human intervention is constantly needed is the maneuvering of an airplane or a spacecraft. In this case, the input conditions are so various that the human intelligence is likely to produce significantly improved results. In addition, the cost of failure is very high. The invocation of human insight and perception greatly influences the output and reduces probability of fatal errors.

In the case of the present inventive integrated medical computer system, the parameters lie in a range somewhere between the two extreme examples given above. At the two extreme blends of man-machine team, the environment may be adjusted sufficiently to generate an all-man-no-machine hospital or an all-robot-no-man hospital. Through the present inventive integrated medical computer system, the less expensive mechanized computer systems take over some of the functions performed by the more expensive physician teams, thus generating more economical and optimal medical environments in countries where physicians and their administrators are expensive.

IV. Medical Computer Architecture 4.1 The Medical Processor Unit

Traditional control processing unit architectures entailing the control unit, the arithmetic unit, the logic unit, the control memory, interrelated with single or multi-bus structures simply do not suffice for the present inventive medical applications. In the present invention, as shown in FIG. 2, the individual medical processor units 103, 105, 107 of the processor net do not process data. They only generate a sequence of subprocedures for current or standard medical procedures consistent with the patient history, physician's expert system capability/expertise, and capability of the medical facilities available in that particular environment.

The typical operator-operand function of the medical processor units of the present invention is neither traditionally binary nor hexadecimal; instead it is based on a combination of factors, such as the knowledge of the patient (available in the patient database), and the experience of the medical team in a general categorical sense and with reference to that particular patient. Both of these are dynamic and can vary significantly. For this reason, expert and knowledge system-based programs are used and used consistent with the capability of the particular medical facility utilizing the present inventive system.

The microprograms in the medical processor units 103, 105, 107 function in three independent fashions initially and then in an interdependent fashion subsequently. First, any approved expert system database is referred to for current concepts and breakthroughs. Second, the practice of the particular physician and the medical facility is referred to in order to be consistent with the knowledge level of the physician and the medical facility. Third, the experience of this physician and earlier physicians with this particular patient is referred. All the necessary checks and verifications are made before administering any particular procedure to any particular patient in view of the patient history.

The output of the present inventive's system medical processor units 103, 105, 107 is a series of instructions based upon the opinion of the current experts approved by a team of physicians (if necessary) which has been verified for processing and expectation by dual independent processors. The output of the medical processor 3 shown in FIG. 1 is a series of subprocedures which is dispatched to the actual medical facilities after appropriate allocation of existing medical resources to the patient's subprocedures. Scheduling, resource sharing, time and priority allocation are done automatically depending on the time or code of service being performed (emergency, standard, diagnostic, routine, etc.). This system is accountable for every step of its functioning and no tampering of any sort is possible by encryption of subprocedural code and patient data. The decryptor key and its code identification is available to the medical staff. Such measures of additional safety and streamlined handling of the procedures make the overall service provisioning current, economic, and accountable at every subprocedural step.

4.2 Subprocedure Instructions

From preliminary considerations, the subprocedure instructions output by medical processor 3 may be numerous broadly definable instructions. Three such categories are knowledge based inferential instructions, search instructions, and administrative or local housekeeping instructions.

In the first category, the knowledge structure of the cause-effect relation is queried, or the logical predictable effect is being sought, or conversely the preconditions for a given state is being investigated by the system 1. It is important to note that certainty is never the strong point of this type of processing. Every step is prone to a confidence level. Thus the chain of subprocedures which makes up a given procedure is the product of such individual confidence levels. Fuzzy-set information processing is most appropriate for the execution for this category of instructions.

In the second category, the search is being initiated by the system 1. Two groups emerge as follows. The first group deals with search in the knowledge (professional, medical opinion, possible cures, diagnostics, etc.) domain and the second group deals with search in the data (files, patient information, databases, insurance company codes, service providers, drug vendors, etc.) domain.

In the first group, the input is the incomplete input data to investigate and other twigs of the knowledge tree are logically associated with the given inputs. Forward and backward pointers are sought by this type of instruction. Similar symptomatic conditions are queried. Associative and forward searches are also initiated by this type of instruction. The first category and second set of instructions are not always mutually exclusive and involving the first set can also invoke the second set and vice versa. Recursive searches should then be possible to/from and within the knowledge domain linking the objects in the data domain.

In the second group, the input is complete for the data processing units to offer a complete and definite response. Example of this type of search is the social security number of a patient or the last visit to the hospital. Definite and precise answers are sought and secured from the present inventive integrated medical system. By separating the searches in two groups, the instruction sets to the integrated medical system can be separated as (a) searches dealing with the knowledge domain or (b) searches dealing with the data domain. The hardware, software, firmware, and peopleware domains responsible for the execution of these two types of searches may thus be isolated and optimized.

In the third category, the administrative functions of the local medical facility are activated. Typical of such instructions are scheduling of operating rooms, issuance of the hospital beds, allocation and consistency of the physician teams, accounting and billing, updating of the patient databases, etc. This category of instruction is localized to the environment of the medical facilities, the personnel, the support staff, and the type of services it is expected to provide. It is suggested that the input/output bus for this category of instruction be isolated from the input/output bus for the other two types of instruction to avoid any possible contamination of information to and from the established knowledge bases. Standard techniques for the construction, maintenance, and use of such knowledge bases are available.

4.3 Speed and Capacity of the Medical Processor Units

From the point of view of implementation, the speed of the medical processor units 103, 105 and 107 is not crucial, except when the physician prefers a real-time look up of how a medical processor unit would handle a certain situation. For this reason two types of medical processor units 103, 105 and 107 may be implemented. The first type of medical processor unit handles the batch type of job processing and the second type handles the on-line processing. The architecture of the two systems thus differs.

4.3.1 Remote Medical Processor Units (Job Processing Environments).

Under normal conditions any particular patients identification is submitted to the medical processor unit with a desired procedure (or a complaint or symptom) and the primary medical/vital data of the patient (e.g., temperature, blood pressure, heart rate, etc. as the paramedical teams dispatch to the physician). The non real-time response is generated and mailed (dispatched electronically) to the doctor. Under the latter conditions, the memory and database capability of the medical processor units 103, 105 and 107 act in conjunction with the artificial intelligence based programs. Typically, in remote medical processor units 103, 105 and 107, the memory size and database capability can be compromised for speed. Dual independent processing (as it is done in most electronic switching system facilities) can only double the cost of high capacity low-speed machine. Job priorities are assignable to the patient and procedures. Procedure sequences are forced in subsequent time slots and time and resource sharing can thus be optimized.

Referring to FIG. 2, preferably almost all remote medical processor units 103, 105 and 107 are network-based since the medical data banks 5, 7 and 9 may be remote and one medical processor unit can service many hundreds of remote input locations. The searches performed by remote medical processor units 103, 105 and 107 become more thorough and wide in non real-time applications.

4.3.2 Hospital Based Medical Processor Units (On-line Processing)

When real-time response is necessary for the medical processor units 103, 105 and 107, the architecture of the present inventive medical system 1 is readjusted for speed and response rather than extensive searches for a large number of patients and subscribers. When certain procedures are needed to be performed quickly, cost of service provisioning, and economics of providing services from various hospitals, laboratories, diagnostic services, or even doctors may be sacrificed for urgency. However, under normal conditions, the patient can be provided with the most cost effective strategy for the services to be performed. Specialized service providers will effectively use all their resources optimally and marginal service providers will get phased out.

4.3.3 Processor Speed Confidence Level and Patient Load

The most time consuming task of the medical processor 3 is the search through the medical data banks 5, 7 and 9 to achieve a high confidence in the inference it draws about the next logical step or the next inferential step. One can defeat the integrated medical system 1 by insisting upon a 100 percent confidence with insufficient input data with exhaustive knowledge bases or conversely with sufficient input data but with inadequate knowledge bases. To be realistic about the results the integrated medical system 1 generates a compromise in what is being queried is essential. Being a programmed system, the system 1 provides only inferential results with varying degrees of confidence. Exhaustive searches take a longer response time as do the peak-hour high-patient-load queries. Here the processor speed provides a compromise. Expensive high speed systems can yield high confidence inferences at the busiest hospital hours and vice versa. Smaller medical facilities will thus need a lower power processor. Job scheduling algorithms by the operating system (as they are used in traditional computer systems) are useful in generating an acceptable response time from the integrated medical system. Other tasks such as patient scheduling, shared resource allocation, sequentiality of subprocedures, minimum hospital stay requirements, etc. are relatively trivial for the integrated medical system.

V. Input/Output Considerations

5.1 Input Aspects

Compared to conventional computer system/networks, the input/output interface parameters can be highly variable for any of the present inventive systems. Streamlining the human and verbal communication may be somewhat effective to accelerate input, but perfection is impossible. For this reason, it is contemplated that, in preferred embodiments, the input to the present integrated medical systems be via laser or otherwise encoded credit-card-sized medical identification for routine cases (or a sequence of cards for extremely acute cases). A short data structure of vital statistics, chronic conditions, allergies, blood type, genetic predispositions, etc. is preferably encoded on this card with a forward pointer to where (i.e., patient database location) all of the patient history is stored. The input processors may be configured within kiosks similar to credit card centers or automatic bank teller machines throughout the population centers tied to the integrated medical system. The cards may also be provided to the patients for accessing information relating to their health care, such as the name of their medication, when to make an appointment to see a primary care physician or specialist, etc.

In addition, the patient access point units can be arranged in a hierarchy and the medical processor can be operated in a manner to direct patient users to alternative patient access point units up or down the aforesaid hierarchy when the medical processor receives preselected types and levels of input data.

It is desirable to have a progression of such medical card centers ranging from most rudimentary to sophisticated medical centers. Typical examples of the rudimentary facilities are those for dispensing routine medication (like insulin, hypertension medication, birth control pills, etc.) from integrated medical system controlled medication warehouses. It is contemplated that the integrated medical system will make an appointment for the patient every so often after the programmed sequence of refills is complete and direct the patient to go to next hierarchical medical card center.

Typical of the next hierarchical medical card center is one equipped with other monitoring devices (such as those for reading the temperature, blood pressure, throat scanners, EKG recorders, imaging centers, etc.). It is also contemplated that the most recent patient input is entered into the patient database via the integrated medical system.

5.2 Output Aspects

The output from the integrated medical system can also have significant variations. Ranging from no action to immediate hospitalization or surgery, the integrated medical system reaches all medical service facilities such as drug dispensing machines, physical therapy centers, blood banks, nursing homes, and other facilities, such as those having EKG recorders, imaging devices, throat scanners, etc.

It is contemplated that one of the possible ways of handling the outputs of the integrated medical system is via specialized nodes created on the network. Similar to the knowledge processing where nodes are addressed by the subject matter they hold, the output nodes are addressed by the type of service that is scheduled through them. For example, if the architecture is equipped via a node for physical therapy, all requests for this service would go through this node. The geographical dispersion of the patients and services center is tackled by mapping the zip codes of the patient and of the service provider.

VI. Implementation Considerations

With reference to FIG. 3, a rudimentary integrated medical system 301 is fabricated by a general purpose computer system which includes a knowledge machine 307. The general purpose computer system acts as the execution unit of the knowledge-based subprocedural instructions similarly to the medical processor 3 of FIG. 1. At the most rudimentary level of software, standard packages such as MYCIN or INTERN are stored within the knowledge machine 307.

Any special hardware or system, functioning as a database machine 311 holds at least a subset of the medical knowledge for a sub-specialty. Access to patient databases 313 and 315, MYCIN databases 317 and 319 and hospital resource databases 321 and 323 would be a reasonable first level connection. The language and user interface input 303 can be keyboard or mouse driven. The output 305 can be made displayed on rudimentary graphic displays. A single user system greatly reduces the need for any sophisticated or expensive hardware.

It is contemplated that the housekeeping functions are handled by one general purpose computer hardware unit within the knowledge machine 307 with a special software for resource (computer and medical) allocation, billing and patient record keeping. For the implantation of large integrated medical systems, specialized software deployment strategy is essential for optimal performance, and to this extent the design of the integrated medical system is similar to the design and deployment of any other large scale special purpose computer system having knowledge processing and database capabilities.

VII. Machine/Network Failure and Other Catastrophic Events

The probability of catastrophic failure is finite, even though it can be made less than any given number by robust design. Certain routine precautionary steps in running and maintaining the integrated medical system can significantly reduce the collapse of the integrated medical system.

Some of these steps are similar to those taken by the Regional Bell Operating Companies in maintaining and safeguarding the Service Control Point database. Banks and computer systems routinely archive their information. Diagnostics are run frequently. Critical information is retained at more than one place. Constant copy and verify statements are executed in the system to monitor the accuracy and authenticity. Critical steps are run twice for confirmation. Incremental change of stored information is rechecked for accuracy and rationale. Dual processors are used to validate the processor functions. Error checking and correction is maintained in all transmission. Encryption is used to prevent tampering. Physician and technician code are checked for authorization to modify or alter the medical records before any changes are accepted.

The architectures of the present integrated medical computer systems permit the identification and isolation of errors and the modules in which the errors originate from. The system monitors these conditions before a catastrophic occurrence by blocking erroneous hardware from its communication capability.

Further diagnostic checks in the present inventive systems is handled by dual processors and elaborate error checking methods known in the art. The error checks not only verify the processing, but can also verify the validity of the results based upon an artificial intelligence based expected outcome. Any unexpected finding are referred to the physician team on duty. Results of procedures are entered into the patient databases.

VIII. Conclusions

Three versions of the present inventive integrated medical computer systems have been presented. The classification of subject matter and the design of modular software oriented to the performance of medical subprocedures becomes essential. Coordination of these medical subprocedures with the expertise of the medical staff and the use and availability of medical facilities in the hospital or the medical center becomes a crucial step in the deployment of the integrated medical system in practice.

The separation of the input and output processing at the nodes of the medical processor units in the network is desirable to streamline the multitude of input-output transactions at any integrated medical system node. The hierarchical separation based upon the specialization of the medical processors makes network addressing of these nodes flexible and straight forward. Additional nodes may be added or removed from the integrated medical system. The hierarchical separation based upon the services provided by the service providers also makes the network addressing of these vendors flexible, straight-forward and programmable. Such vendors may be added or deleted from the integrated medical system to offer most optimal and economical service by the integrated medical system.

Such modifications are feasible due to developments in database storage and access technology (for the hierarchical organization of medical information, its real-time access, and associative searches). Artificial intelligence techniques (for knowledge processing such as forward/backward linking, inductive and predictive logic, pattern recognition, and expert system consultation capability), and specialized operating systems (for resource management, allocation, conflict and dead-lock resolution, accounting, billing, and record keeping) can be incorporated within the present inventive medical computer system.

It is contemplated to have a database where opinions and subjective comments are entered regarding the integrated medical system and retrieved by a voice activated message retrieval system. It is further contemplated to add pictures, X-rays, and CATSCANs onto a visual database of the computer system, making the integrated medical system a truly multimedia system.

Obviously, numerous modifications and variations of the present invention are possible in light of the above teachings. It is therefore understood that within the scope of the appended claims, the invention may be practiced otherwise than as specifically described herein.

What is claimed is:

1. A hospital-based integrated medical computer system for processing medical and patient information involving a plurality of tasks and allocation of a plurality of medical resources and for generating medical knowledge, diagnoses and prognoses as a solution to an input specified medical problem, the hospital-based integrated medical computer system comprising:
    a macrocomputer comprising:
        a network of medical data banks having memory for storing medical information and a processor for executing instructions; and
    a microcomputer comprising:
        at least one processor, including a memory for storing medical information and connected via a data bus to the network of medical data banks of the macrocomputer, the at least one processor further including a plurality of separate processor hardware modules operatively connected to said memory of the at least one processor, said modules including a communication module, at least one switching module, an administrative module and a knowledge module; and
    hardware, firmware and software operatively connected by a data bus in said processor hardware modules to enable the modules to perform at least the following functions:
        (i.) for the communication module, to control data communications between the other modules, the main memory and said at least one processor, so that they effectively communicate with one another and to receive the input medical problem;
        (ii.) for said at least one switching module, to select and switch between selected information required by a process for solving a particular problem;
        (iii.) for the administrative module, to perform housekeeping functions, including multi-tasking control to allocate the medical resources, and real-time multi-tasking and scheduling of the tasks; and
        (iv.) for the knowledge module, to operate knowledge processing functions on the medical and patient information to generate a medical problem instruction for generating the solution and to store the medical and patient information in said medical data banks; and
    wherein at least one of the medical data banks of the macrocomputer and the processor of the microcomputer are configured to receiver the medical problem instruction for execution of macroscopic and microscopic functions in the respective memory thereof to macroscopically and microscopically generate the solution to the medical problem.

2. The hospital-based integrated medical computer system of claim 1 wherein the processor further includes a general patient database connected to at least one of said memory and said processor hardware modules for the processor hardware modules to perform the respective functions using general patient information stored in the general patient database.

3. The hospital-based integrated medical computer system of claim 1 wherein the processor further includes a plurality of physician-based, remotely located physician access point units connected to said processor for operating the processor from remote sources using the processor hardware modules connected to the processor by the data bus.

4. The hospital-based integrated medical computer system of claim 1 wherein said medical data banks include a plurality of subareas of knowledge, and said knowledge module includes a plurality of subprocesses, and said communication module has software to further control communication between the subareas of the medical data banks and the knowledge module and to control the subprocesses as they pertain to an input medical problem and to systematically organize inputs and outputs of the subprocesses to execute the medical instruction to generate a medical knowledge diagnosis as the solution for the input medical problem.

5. The hospital-based integrated medical computer system of claim 4 wherein the software for the communication module selects and collates subprocesses of the knowledge module and the data from the medical data banks toward solving a particular medical query.

6. The hospital-based integrated medical computer system of claim 1 wherein at least one additional processor is connected to said memory and said modules to provide additional processing of the medical and patient information.

7. The hospital-based integrated medical computer system of claim 1 further including a plurality of remotely located patient access point units connected to said processor for operating the processor from remote sources using the processor hardware modules connected to the processor by the data bus by patients for predetermined purposes.

8. The hospital-based integrated medical computer system of claim 1 further including:
   a plurality of testing facilities; and
   a services facilities unit connected to the testing facilities and the processor by the data bus and including an input/output device to receive and send output and input information and commands from said processor to provide patient and patient-related testing results from the plurality of testing facilities to a user.

9. The hospital-based integrated medical computer system of claim 1 wherein the processor is connected to at least a second identical processor to be a plurality of processors with memories and with a plurality of sets of said modules and said plurality of processors are linked together to establish a processor net.

10. The hospital-based integrated medical computer system of claim 9 further including a plurality of general patient databases, each of said plurality of general patient databases being connected to at least one of said plurality of processors for the processor hardware modules of each respective processor to perform the respective functions using general patient information stored in the general patient databases.

11. The hospital-based integrated medical computer system of claim 9 further including a plurality of physicians based, remotely located physician access point units connected to said processors for operating the processor from remote sources using the processor hardware modules connected to the processor by the data bus.

12. The hospital-based integrated medical computer system of claim 9 further including a plurality of remotely located patient access point units connected to said processors for operating from remote sources using the processor hardware modules connected to the processor by the data bus by patients for predetermined purposes.

13. The hospital-based integrated medical computer system of claim 9 further including a plurality of services facilities units connected to the processor to receive and send output and input information and commands from said processors to provide patient and patient-related testing results to user.

14. The hospital-based integrated medical computer system of claim 9 further including a plurality of separate integrated services digital networks connected to said processor net for providing digital communications thereupon for supporting separate medically related functions.

15. The hospital-based integrated medical computer system of claim 14 wherein at least one of said integrated services digital networks includes a drug and device vendor net for providing drug and medical device information to the processor.

16. The hospital-based integrated medical computer system of claim 14 wherein at least one of said integrated services digital networks includes a service facilities net for accessing service facilities connected to the processor.

17. The hospital-based integrated medical computer system of claim 14 wherein at least one of said integrated services digital networks includes a medical knowledge net for accessing medical knowledge banks connected to the processor.

18. The hospital-based integrated medical computer system of claim 14 wherein at least one of said integrated services digital networks includes an initial patient screening net for accessing initial patient screening facilities connected to the processor.

19. The hospital-based integrated medical computer system of claim 14 wherein at least one of said integrated services digital networks includes a physical access net connected to the processor.

20. The hospital-based integrated medical computer system of claim 14 wherein at least one of said integrated services digital networks includes a plurality of general patient databases for the processor hardware modules of each respective processor to perform the respective functions using general patient information stored in the general patient databases and retrieved using the at least one integrated services digital network .

21. A method of operating a hospital-based integrated medical computer system for processing medical and patient information involving a plurality of tasks and allocation of a plurality of medical resources and for generating medical knowledge, diagnoses and prognoses as solutions to an input medical problem, the method comprising the steps of:

storing medical information in a macrocomputer having a network of medical data banks having memory;

operating at least one processor of a microcomputer, which includes a memory for storing medical information, the at least one processor connected to the network of medical data banks and a plurality of separate processor hardware modules operatively connected to said memory of the at least one processor, said modules including a communication module, at least one switching module, an administrative module and a knowledge module;

operating hardware, firmware and software operatively connected by a data bus in said processor hardware modules to perform at least the following functions:
   (i.) for the communication module, controlling data communications between the other modules, the main memory and said at least one processor, so that they effectively communicate with one another;
   (ii.) for said at least one switching module, selecting and switching between selected information as required by a process for solving a particular problem;
   (iii.) for the administrative module, performing housekeeping functions, including multi-tasking control to allocate the medical resources, and real-time multi-tasking and scheduling of the tasks; and
   (iv.) for the knowledge module, operating knowledge processing functions on the medical and patient information to generate a medical problem instruction for generating the solution and to store the medical and patient information in said medical data banks;

receiving the medical problem instruction in at least one of the medical data banks and the processor;

executing the medical problem instruction in the respective memory thereof of the at least one of the medical data banks, ad the processor by respectively executing macroscopic and microscopic functions; and macroscopically and microscopically generating the solution to the medical problem.

22. The method of claim 21 further including the step of storing medical and patient information in a general patient database connected to at least one of said memory and said processor hardware modules.

23. The method of claim 21 further including the steps of:
providing a plurality of physician-based, remotely located physician access point units connected to said processor for; and
operating the processor from remote sources using the processor hardware modules connected to the processor by the data bus.

24. The method of claim 21 further including the steps of:
providing medical data banks including a plurality of subareas of knowledge, and said knowledge module includes a plurality of subprocesses, and said communication module has software;
controlling control communication between the subareas of the medical data banks and the knowledge module and to control the subprocesses as they pertain to a particular medical problem;
systematically organizing inputs and outputs of the subprocesses; and
executing the medical instruction to generate a medical knowledge diagnosis as the solution for the input medical problem.

25. The method of claim 24 further including the steps of:
controlling the software for the communication module to select and collate subprocesses of the knowledge module and the data from the medical data banks; and solving a particular medical query.

26. The method of claim 21 further including the steps of:
providing a plurality of remotely located patient access point units connected to said processor; and
operating the processor from remote sources using the processor hardware modules connected to the processor by the data bus by patients for predetermined purposes.

27. The method of claim 21 further including the steps of:
providing a services facilities unit to receive and send output and input information and commands from said processor; and
providing patient and patient-related testing results to a user for accessing service facilities connected to the processor.

28. The method of claim 21 further including the steps of:
providing at least a second identical processor connected to form a plurality of processors with memories and with a plurality of sets of said modules; and
operating and linking together said plurality of processors to establish a processor net.

29. The method of claim 28 further including the steps of:
providing a plurality of remotely located patient access point units connected to said processors; and
operating the processor from remote sources using the processor hardware modules connected to the processor by the data bus by patients for predetermined purposes.

30. The method of claim 29 further including the steps of:
providing individual patient identification cards to patient users;
providing predetermined individual patient information to patient users;
operating the processor to receive input from said patent identification cards and said patient users; and
outputting the individual patient information from the processor to said patient users.

31. The method of claim 29 further including the steps of:
arranging the patient access point units in a hierarchy; and
operating the processor to direct patient users to alternative patient access point units up or down the aforesaid hierarchy when the processor receives preselected types and levels of input data.

\* \* \* \* \*